(12) United States Patent
Chindapol et al.

(10) Patent No.: US 9,301,240 B1
(45) Date of Patent: Mar. 29, 2016

(54) DETERMINING THE AVAILABILITY OF A RADIO ACCESS TECHNOLOGY

(71) Applicant: Sprint Spectrum LP, Overland Park, KS (US)

(72) Inventors: Aik Chindapol, Washington, DC (US); Muhammad Naim, Sterling, VA (US); Gila Ghavami, Reston, VA (US); Shahzada Rasool, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 344 days.

(21) Appl. No.: 14/051,412

(22) Filed: Oct. 10, 2013

(51) Int. Cl.
*H04W 36/08* (2009.01)
*H04W 48/16* (2009.01)

(52) U.S. Cl.
CPC ..................................... *H04W 48/16* (2013.01)

(58) Field of Classification Search
CPC ... H04W 4/20; H04W 36/0066; H04W 36/08; H04W 76/021; H04W 28/18; H04W 48/08; H04L 69/24; H04L 5/0032; H04L 65/1069; H04B 1/38
See application file for complete search history.

(56) References Cited

U.S. PATENT DOCUMENTS

| 7,359,715 | B2 | 4/2008 | Choksi | |
|---|---|---|---|---|
| 8,917,658 | B2 * | 12/2014 | Bjork | 370/328 |
| 2009/0068970 | A1 | 3/2009 | Ahmed et al. | |
| 2013/0196661 | A1 * | 8/2013 | Lee | H04W 48/18 455/434 |

\* cited by examiner

*Primary Examiner* — Quan M Hua

(57) ABSTRACT

In systems and methods of determining the availability of a radio access technology, a first message is received from a wireless device in communication with an access node using a first radio access technology, wherein the first message comprises a request of the availability of a second radio access technology at the access node. Based on the first message, an identifier of the wireless device and an identifier of the first access node are determined. Based on the access node identifier, it is identified whether the second radio access technology is available at the access node, and a second message is sent to the wireless device instructing the wireless device to scan for the second radio access technology when it is available.

16 Claims, 7 Drawing Sheets

DETERMINING THE AVAILABILITY OF A RADIO ACCESS TECHNOLOGY

TECHNICAL BACKGROUND

Where a wireless communication system supports two or more radio access technologies, a wireless device can be configured to detect the network presence of each radio access technology and determine which technology to use for network communication. However, a wireless device can be caused to perform unnecessary scanning for radio access technologies even where one or more radio access technologies are not available, for example, because of limited coverage of a radio access technology. Scanning for a radio access technology which is not available within the limits of detection of the wireless device can cause network entry delay and can unnecessarily deplete battery power of the wireless device.

OVERVIEW

In operation, a first message is received from a wireless device in communication with an access node, where the wireless device uses a first radio access technology, and the message comprises a request of the availability of a second radio access technology at the access node. Based on the first message, an identifier of the wireless device and an identifier of the first access node are determined. Based on the access node identifier, it is identified that the second radio access technology is available at the access node, and a second message is sent to the wireless device instructing the wireless device to scan for the second radio access technology.

DETAILED DESCRIPTION

Figure 1:
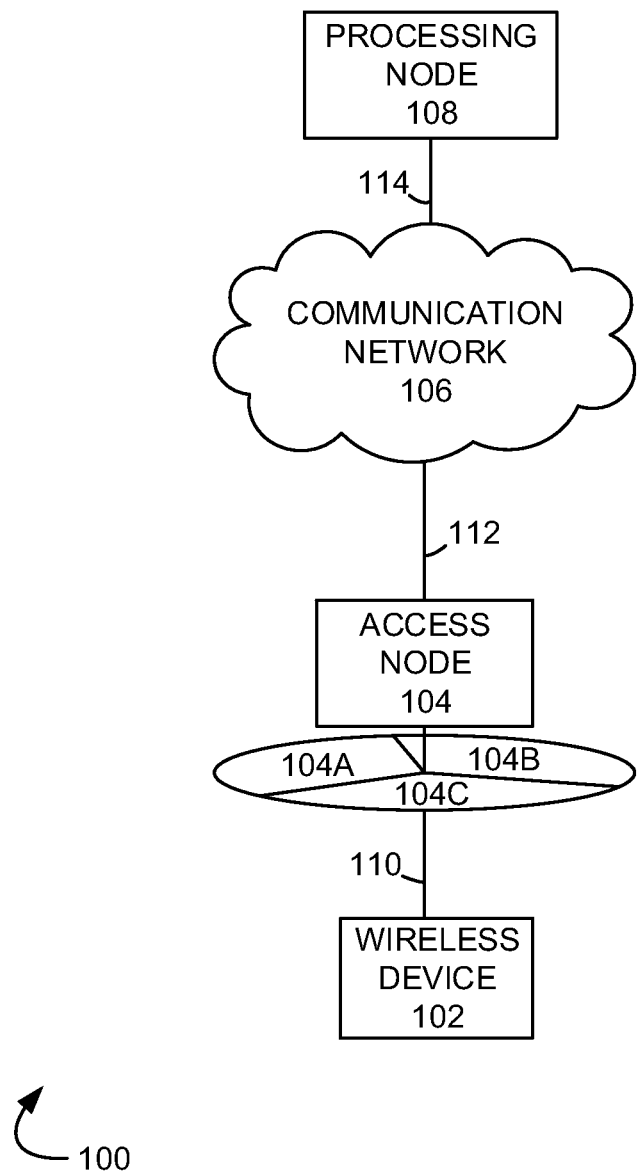
FIG. 1 illustrates an exemplary communication system to determine the availability of a radio access technology.

FIG. 1 illustrates an exemplary communication system 100 to determine the availability of a radio access technology comprising wireless device 102, access node 104, communication network 106, and processing node 108. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 110.

Access node 104 is a network node capable of providing wireless communications to wireless device 102, and can be, for example, a base transceiver station, a radio base station, an eNodeB device, or an enhanced eNodeB device. Access node 104 can comprise a coverage area which can be divided into two or more portions or sectors, illustrated in FIG. 1 as sectors 104A, 104B, and 104C. Each sector can comprise multiple carrier bands, and can also comprise two or more radio access technologies, from access node 104. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Processing node 108 can comprise a processor and associated circuitry to execute or direct the execution of computer-readable instructions, and can be configured to determining the availability of a radio access technology at access node 104. Processing node 108 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 108 can receive instructions and other input at a user interface. Examples of processing node 108 can comprise a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, a controller node such as a mobile switching center (MSC), a dispatch call controller (DCC), a mobility management entity (MME), or other similar network node, including combinations thereof. Processing node 108 is in communication with communication network 106 over communication link 114.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, communication network 106, and processing node 108 which are omitted for clarity, including additional processing nodes, routers, gateways, and physical and/or wireless data links for carrying data among the various network elements.

In a wireless communication network which uses two or more radio access technologies, a wireless device can be enabled to detect a presence of each radio access technology. Further, a network element of the system, such as a processing node or the wireless device, can be enabled to determine which radio access technology to select for wireless communications. For example, wireless device 102 can be enabled to scan for the presence of radio access technologies. Also, coverage information of each radio access technology (including coverage holes of each radio access technology) of the communication system can be provided and stored on wireless device 102, and the coverage information can be used to trigger wireless device 102 to scan for available radio access technologies. However, a wireless device may scan for a certain radio access technology even when that radio access technology is not available or detectable by the wireless device, which can cause delay in establishing network communication with wireless device 102, and may further unnecessarily drain a battery of wireless device 102. The negative effects on wireless device 102 are exacerbated in a case where communication system 100 includes a radio access technology which is both desirable and is not fully or uniformly deployed in communication system 100.

In operation, a first message is received from wireless device 102, which is in communication with access node 104 using a first radio access technology. The first message requests an availability of a second radio access technology at access node 104. The first message can be received from wireless device 102 at access node 104, or at processing node 108, or at another network element of communication system 100. Based on the first message, an identifier of wireless device 102 and of access node 104 can be determined. Based on the access node identifier it can be determined that the second radio access technology is available at the access node. It can further be determined based on the wireless device identifier that wireless device 102 is capable of using the second radio access technology. When the second radio access technology is available at access node 104, and when wireless device 102 is capable of using the second radio access technology, a second message is sent to wireless device 102 instructing wireless device 102 to scan for the second radio access technology. The second message can be sent from access node 104 at the direction of processing node 108, or access node 104 can make the above-described determinations and send the second message to wireless device 102.

Figure 2:
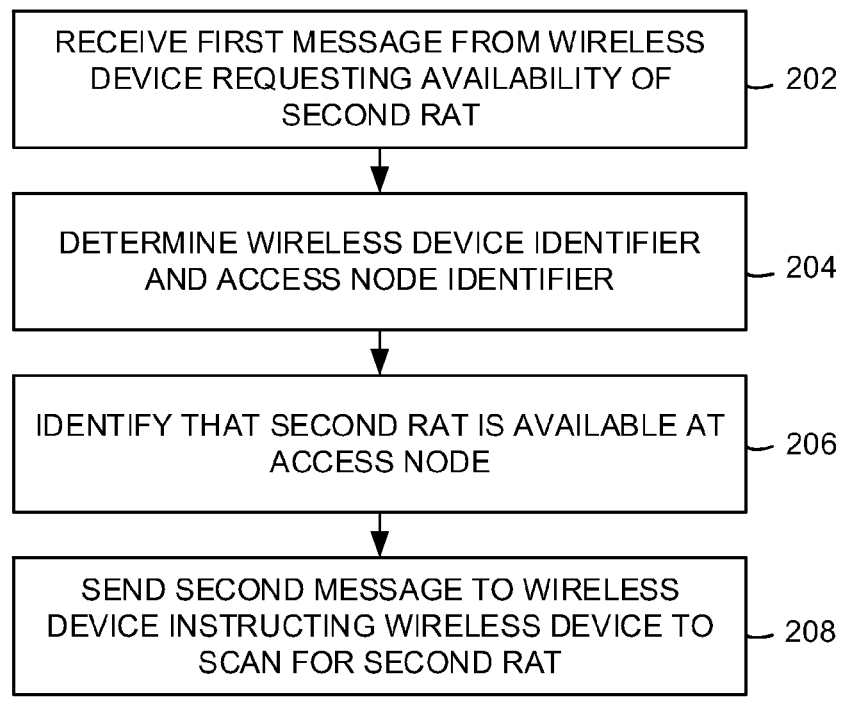
FIG. 2 illustrates an exemplary method of determining the availability of a radio access technology.

FIG. 2 illustrates an exemplary method of determining the availability of a radio access technology. A first message is received from a wireless device requesting an availability of a second radio access technology at the access node. For example, wireless device 102 can communicate with access node 104 using a first radio access technology, and wireless device 102 can send a message to access node 104 to determine whether a second radio access technology is available at access node 104. Communication system 100 can be a multi-technology communication system in which two or more radio access technologies are provided by the communication system.

However, every radio access technology of the communication system may not be available at every access node, owing to the age of the equipment at an access node, or the expense of deploying a certain radio access technology at the access node, or because the access node has node yet been configured to use the radio access technology, or because a backhaul link between the access node the communication system cannot handle requirements of a certain radio access technology, and the like. To begin to determine the availability of the second radio access technology at access node 104, wireless device 102 may send a first message. In an embodiment, the second radio access technology can comprise a lower latency or higher speed radio access technology than the first radio access technology. For example, the first radio access technology can comprise CDMA, W-CDMA, GSM, eHRPD (evolved high rate packet data), and the like, the second radio access technology can comprise LTE, LTE Advanced, WiMAX, or another so-called 4G radio access technology. The first message can be received at access node 104, and can be processed at processing node 108, or at access node 104, or at another network element of communication system 100. The first message can comprise an explicit request for the availability of the second radio access technology, or it can comprise a message as simple as a "ping" or other short message directed at a network element (such as processing node 108). Further, processing node 108 (or another network element) can be configured to respond to the explicit request, the "ping", or another similar message.

Based on the first message, an identifier of the wireless device and an identifier of the first access node are determined (operation 204). The identifier of the wireless device can comprise a unique identifier of the wireless device which indicates the capabilities of the wireless device to use one or more radio access technologies. Additionally, or alternatively, the wireless device identifier can be used by processing node 108 (or another network element of communication system 100) to determine whether wireless device 102 is authorized to use the second radio access technology. When wireless device 102 is not authorized to use the second radio access technology, a message indicating the lack of authorization can be sent to the wireless device. The identifier of the first access node can comprise a unique identifier of the access node which indicates the capabilities of the access node, including the radio access technologies available at the access node.

Based on the access node identifier, it is identified that the second radio access technology is available at the access node (operation 206). The identification that the second radio access technology is available at access node 104 can be made at processing node 108, at access node 104, or at another network element of communication system 100. Subsequently, a second message is sent to the wireless device instructing the wireless device to scan for the second radio access technology (operation 208). When wireless device 102 receives the second message, wireless device 102 may then scan for available signals from access node 104 using the second radio access technology.

Figure 3:
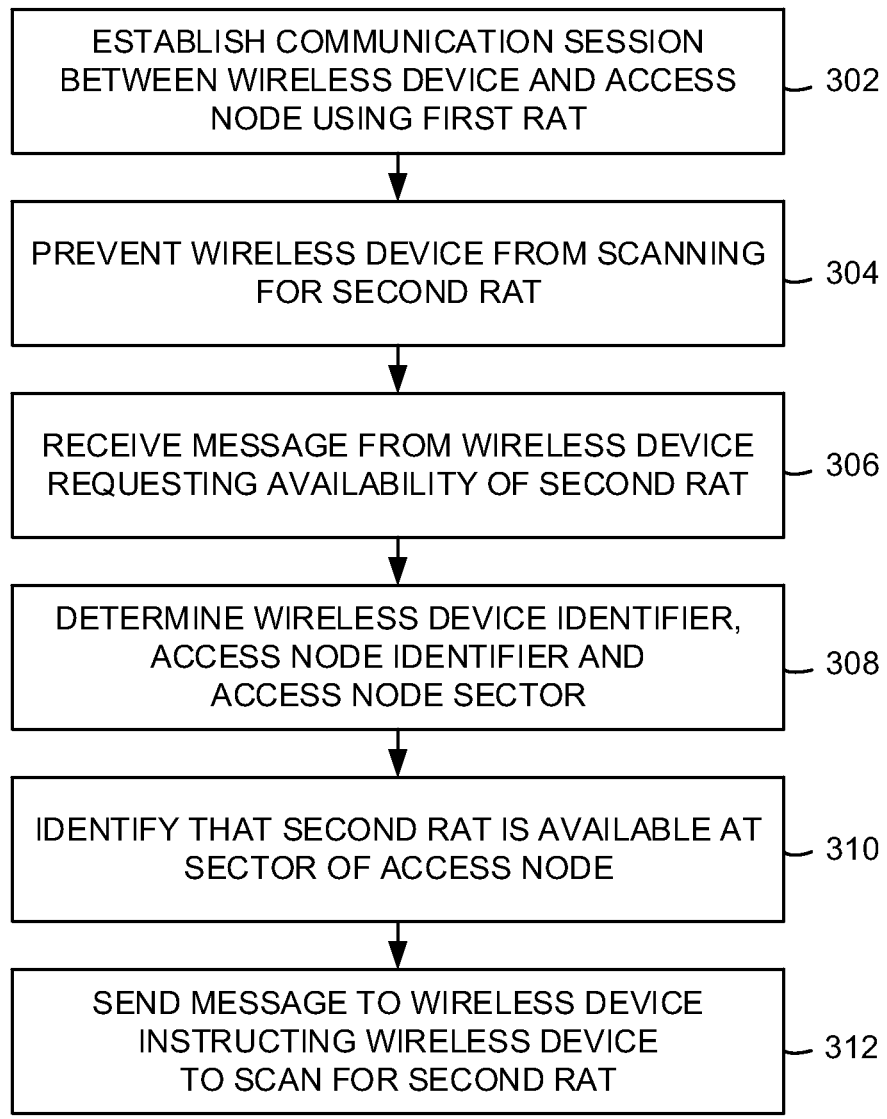
FIG. 3 illustrates another exemplary method of determining the availability of a radio access technology.

FIG. 3 illustrates another exemplary method of determining the availability of a radio access technology. In operation 302, a communication session is established between a wireless device and an access node using a first radio access technology. For example, wireless device 102 can perform initial synchronization and network entry processes with access node 104 and a communication session can be established between wireless device 102 and access node 104 using a first radio access technology.

In addition, the wireless device can be prevented from scanning for a second radio access technology (operation 304). For example, wireless device 102 can be prevented by instructions on wireless device 102 from scanning for the second radio access technology. Additionally, or alternatively, a message can be sent to wireless device 102 to instruct it not to scan for the second radio access technology by access node 104, or by processing node 108, or by another network element of communication system 100. In an embodiment, wireless device 102 can be instructed (or can execute instructions) to prevent scanning for the second radio access technology when wireless device 102 uses the first radio access technology.

When the communication session is established between the wireless device and the access node, a message is received from the wireless device requesting an availability of a second radio access technology at the access node (operation 306). For example, wireless device 102 can communicate with access node 104 using the first radio access technology, and wireless device 102 can send a message to access node 104 to determine whether a second radio access technology is available at access node 104. Communication system 100 can be a multi-technology communication system in which two or more radio access technologies are provided by the communication system. In an embodiment, the second radio access technology can comprise a lower latency or higher speed radio access technology than the first radio access technology. For example, the first radio access technology can comprise CDMA, W-CDMA, GSM, eHRPD (evolved high rate packet data), and the like, the second radio access technology can comprise LTE, LTE Advanced, WiMAX, or another so-called 4G radio access technology. The first message can be received at access node 104, and can be processed at processing node 108, or at access node 104, or at another network element of communication system 100. In some cases, the first radio access technology can be associated with a first communication network and the second radio access technology can be associated with a second communication network. In an embodiment, message is received from the wireless device when the wireless device establishes a data communication session with the access node using the first radio access technology to send the message.

Based on the message from the wireless device, an identifier of the wireless device, an identifier of the first access node, and a sector of the access node with which the wireless device is in communication are determined (operation 308). The identifier of the wireless device can comprise a unique identifier of the wireless device which indicates the capabilities of the wireless device to use one or more radio access technologies. Additionally, or alternatively, the wireless device identifier can be used by processing node 108 (or another network element of communication system 100) to determine whether wireless device 102 is authorized to use the second radio access technology. When wireless device 102 is not authorized to use the second radio access technology, a message indicating the lack of authorization can be sent to the wireless device. The identifier of the first access node can comprise a unique identifier of the access node which indicates the capabilities of the access node, including the radio access technologies available at the access node. The sector identifier can indicate which of sectors 104A, 104B, and 104C wireless device 102 is in communication with. In an embodiment, the second radio access technology may be available in less than all of the sectors of access node 104. Additionally, or alternatively, the sector identifier can be used to determine a loading of a channel in the identified sector which uses the second radio access technology, and the determined loading may affect the availability of the second radio access technology.

Based on the access node identifier and the access node sector identifier, it is identified that the second radio access technology is available at the access node (operation 310). The identification that the second radio access technology is available at access node 104 can be made at processing node 108, at access node 104, or at another network element of communication system 100. Subsequently, a message is sent to the wireless device instructing the wireless device to scan for the second radio access technology (operation 312). When wireless device 102 receives the second message, wireless device 102 may then scan for available signals from access node 104 using the second radio access technology. In an embodiment, wireless device 102 is prevented from scanning for the second access technology until the second message is sent instructing the wireless device to scan for the second radio access technology.

Figure 4:
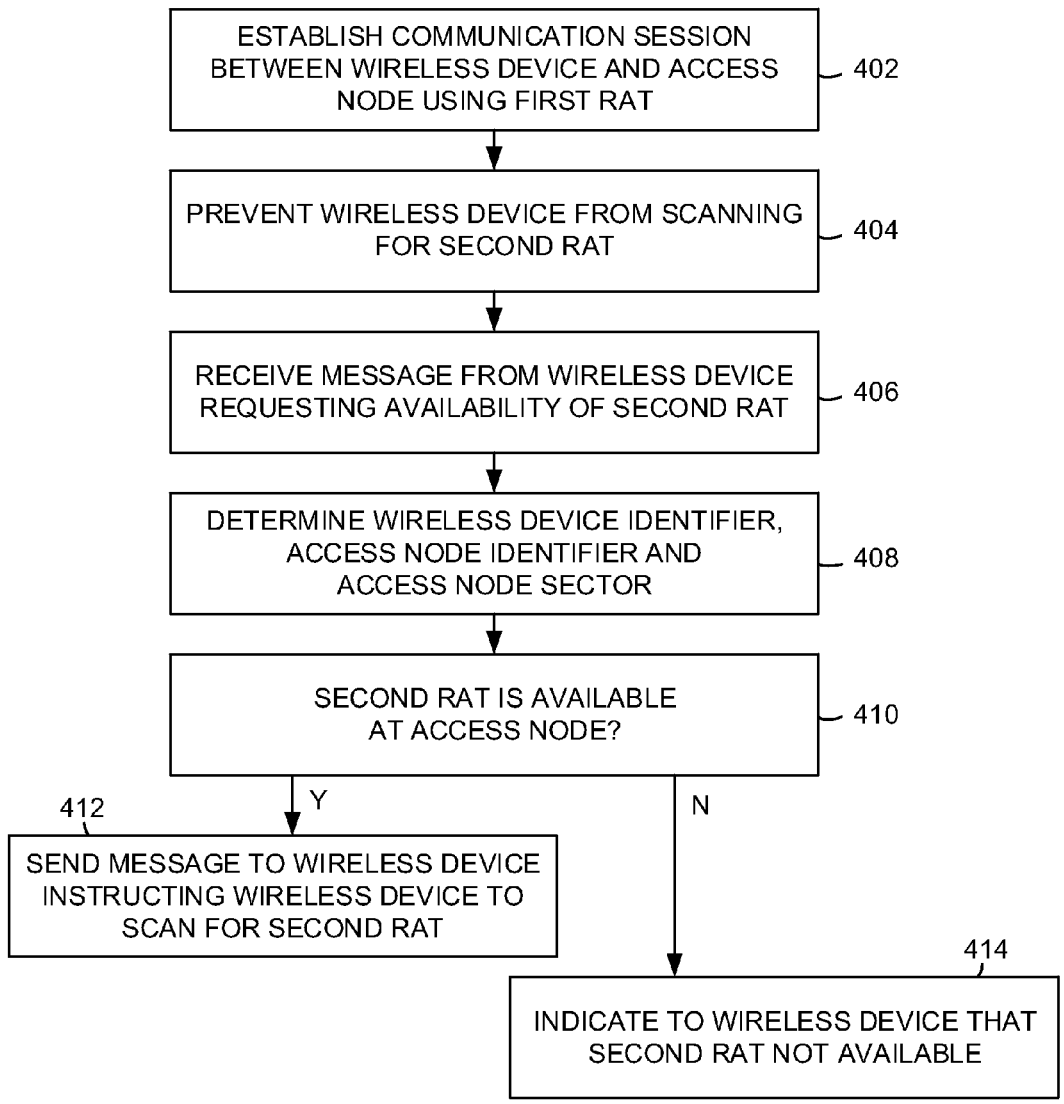
FIG. 4 illustrates another exemplary method of determining the availability of a radio access technology.

FIG. 4 illustrates another exemplary method of determining the availability of a radio access technology. In operation 402, a communication session is established between a wireless device and an access node using a first radio access technology. For example, wireless device 102 can perform initial synchronization and network entry processes with access node 104 and a communication session can be established between wireless device 102 and access node 104 using a first radio access technology. Additionally, the wireless device can be prevented from scanning for a second radio access technology (operation 404). For example, wireless device 102 can be prevented by instructions on wireless device 102 from scanning for the second radio access technology. Additionally, or alternatively, a message can be sent to wireless device 102 to instruct it not to scan for the second radio access technology by access node 104, or by processing node 108, or by another network element of communication system 100.

When the communication session is established between the wireless device and the access node, a message is received from the wireless device requesting an availability of a second radio access technology at the access node (operation 406). For example, wireless device 102 can communicate with access node 104 using the first radio access technology, and wireless device 102 can send a message to access node 104 to determine whether a second radio access technology is available at access node 104. The message can also be received at processing node 108. Communication system 100 can be a multi-technology communication system in which two or more radio access technologies are provided by the communication system. In an embodiment, the second radio access technology can comprise a lower latency or higher speed radio access technology than the first radio access technology. For example, the first radio access technology can comprise CDMA, W-CDMA, GSM, eHRPD (evolved high rate packet data), and the like, the second radio access technology can comprise LTE, LTE Advanced, WiMAX, or another so-called 4G radio access technology. The first message can be received at access node 104, and can be processed at processing node 108, or at access node 104, or at another network element of communication system 100. In some cases, the first radio access technology can be associated with a first communication network and the second radio access technology can be associated with a second communication network. In an embodiment, message is received from the wireless device when the wireless device establishes a data communication session with the access node using the first radio access technology to send the message.

Based on the message from the wireless device, an identifier of the wireless device, an identifier of the first access node, and a sector of the access node with which the wireless device is in communication are determined (operation 408). The identifier of the wireless device can comprise a unique identifier of the wireless device which indicates the capabilities of the wireless device to use one or more radio access technologies. Additionally, or alternatively, the wireless device identifier can be used by processing node 108 (or another network element of communication system 100) to determine whether wireless device 102 is authorized to use the second radio access technology. When wireless device 102 is not authorized to use the second radio access technology, a message indicating the lack of authorization can be sent to the wireless device. The identifier of the first access node can comprise a unique identifier of the access node which indicates the capabilities of the access node, including the radio access technologies available at the access node. The sector identifier can indicate which of sectors 104A, 104B, and 104C wireless device 102 is in communication with. In an embodiment, the second radio access technology may be available in less than all of the sectors of access node 104. Additionally, or alternatively, the sector identifier can be used to determine a loading of a channel in the identified sector which uses the second radio access technology, and the determined loading may affect the availability of the second radio access technology.

Based on the access node identifier and the access node sector identifier it is determined whether the second radio access technology is available at the access node (operation 410). The identification that the second radio access technology is available at access node 104 can be made at processing node 108, at access node 104, or at another network element of communication system 100. When the second radio access is available access node 104 (operation 410-Y), a message is sent to wireless device 102 instructing wireless device 102 to scan for the second radio access technology (operation 412). For example, wireless device 102 can be instructed to scan for a carrier band using the second radio access technology, or wireless device 102 can be instructed to scan for some other indication that a carrier using the second radio access technology is available at access node 104. In another example, the second message instructs the wireless device to scan for the second radio access technology while maintaining communication with the access node using the first radio access technology. The maintained communication can be a data communication session using the first radio access technology.

When the second radio access technology is not available at access node 104 (operation 410-N), an indication is sent to wireless device 102 that the second radio access technology is not available (operation 414). The indication can comprise an instruction preventing wireless device 102 from scanning for the second access technology. Additionally, or alternatively, the indication can trigger instructions on wireless device 102 which prevent the wireless device from scanning for the second radio access technology.

The message instructing wireless device 102 to scan for the second radio access technology, or indicating that the second radio access technology is not available, can be sent after a predetermined period of time from a time that the message requesting an availability of a second radio access technology is received. Further, the predetermined period of time can be selected so as to convey additional information to wireless device 102. For example, a message size of the message from wireless device 102 requesting availability of the second radio access technology, or of the message indicating the availability of the second radio access technology (from, e.g., processing node 510), or of both messages, can be reduced to decrease network load or network congestion which may be caused by the messages. In an embodiment, a small-sized message (such as a "ping" message or other similar message) sent by wireless device 102 can be directed to a particular network location, such as an interface of processing node 108. In response, the message sent by processing node 108 can be similarly small-sized, and can be sent to wireless device 102 after a predetermined period of time following the receipt of the message from wireless device 102.

As described above, the predetermined time can be selected to convey availability of the second radio access technology. For example, the second message can be sent at a first predetermined time after the first message is received to indicate that the second radio access technology is not present at the access node. Also, the second message can be sent at a second predetermined time after the first message is received to indicate that a channel using the second radio access technology at the access node cannot accept the wireless device, for example, because a congestion level of the channel meets a congestion level threshold. Additionally, the second message can be sent at a third predetermined time after the first message is received to indicate that the second radio access technology is not available at the access node nor at a neighbor access node. Further, the second message can be sent at a fourth predetermined time after the first message is received to indicate that the second radio access technology is not available at the access node nor at second access nodes within a predetermined radius of the access node. Other possible predetermined times associated with other information are also possible, including combinations of the foregoing.

The predetermined times can further be selected based on the first radio access technology. For example, the predetermined times can be selected to reflect the latency, or ability to convey data, of a specific radio access technology. In an embodiment, a first set of predetermined times can be used where, for example, the first radio access technology comprises CDMA, and a second set of predetermined times can be used where, for example, the first radio access technology comprises LTE. The predetermined times can be increased based on a determined level of network congestion or resource utilization.

The indication to the wireless device that the second radio access technology is not available can also comprise an instruction to send another message requesting the availability of the second radio access technology at a future time. The future time can comprise a time after a predetermined duration, or it can comprise a time when the wireless device enters a new sector of the access node, or when the wireless device enters a sector of second access node. The future time can also be a plurality of future times, such that the wireless device requests the availability of the second radio access node periodically. Other future times are also possible, as well as combinations of the foregoing.

Figure 5:
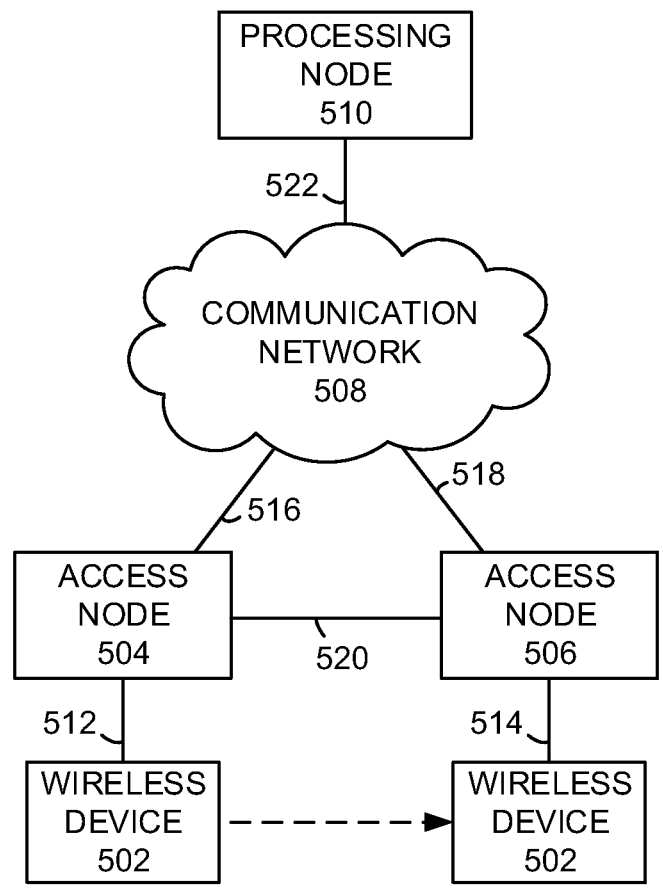
FIG. 5 illustrates another exemplary communication system to determine the availability of a radio access technology.

FIG. 5 illustrates another exemplary communication system 500 to determine the availability of a radio access technology comprising wireless device 502, access node 504, access node 506, communication network 508, and processing node 510. Examples of wireless device 502 can comprise a cell phone, a smart phone, a computing platform such as a laptop, palmtop, or tablet, a personal digital assistant, or an internet access device, including combinations thereof. Wireless device 502 can communicate with access node 504 over communication link 512, and with access node 506 over communication link 514.

Access nodes 504 and 506 are each a network node capable of providing wireless communications to wireless device 502, and can be, for example, a base transceiver station, a radio base station, an eNodeB device, or an enhanced eNodeB device. Access node 504 is in communication with communication network 508 over communication link 516, and access node 506 is in communication with communication network 508 over communication link 518. Access nodes 504 and 506 can communicate with each other over communication link 520.

Communication network 508 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 508 can be capable of carrying voice information and other data, for example, to support communications by a wireless device such as wireless device 502. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 508 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 508 may also comprise a wireless network, including base stations, wireless communication nodes, telephony switches, internet routers, network gateways, computer systems, communication links, or some other type of communication equipment, and combinations thereof.

Processing node 510 can comprise a processor and associated circuitry to execute or direct the execution of computer-readable instructions, and can be configured to determining the availability of a radio access technology at access nodes 504 and 506. Processing node 510 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 510 can receive instructions and other input at a user interface. Examples of processing node 510 can comprise a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, a controller node such as a mobile switching center (MSC), a dispatch call controller (DCC), a mobility management entity (MME), or other similar network node, including combinations thereof. Processing node 510 is in communication with communication network 508 over communication link 522.

Communication links 512, 514, 516, 518, 520 and 522 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 504 and 506, communication network 508, and processing node 510 which are omitted for clarity, including additional processing nodes, routers, gateways, and physical and/or wireless data links for carrying data among the various network elements.

Figure 6:
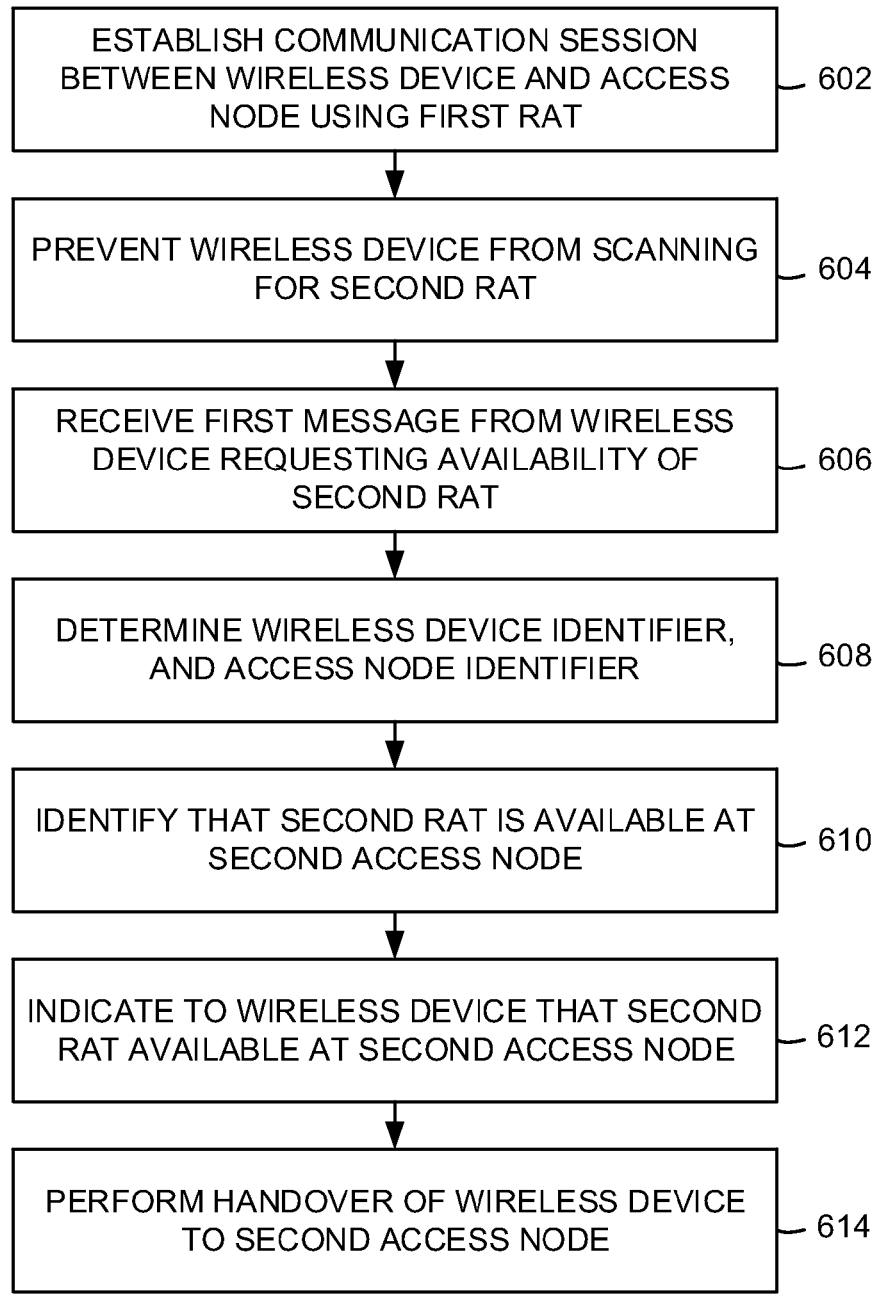
FIG. 6 illustrates another exemplary method of determining the availability of a radio access technology.

FIG. 6 illustrates another exemplary method of determining the availability of a radio access technology. A communication session is established between a wireless device and an access node using a first radio access technology (operation 602). For example, wireless device 502 can perform initial synchronization and network entry processes with access node 504 and a communication session can be established between wireless device 502 and access node 504 using a first radio access technology. Additionally, the wireless device can be prevented from scanning for a second radio access technology (operation 604). For example, wireless device 502 can be prevented by instructions on wireless device 502 from scanning for the second radio access technology. Additionally, or alternatively, a message can be sent to wireless device 502 to instruct it not to scan for the second radio access technology by access node 504, or by processing node 510, or by another network element of communication system 500.

When the communication session is established between the wireless device and the access node, a message is received from the wireless device requesting an availability of a second radio access technology at the access node (operation 606). For example, wireless device 502 can communicate with access node 504 using the first radio access technology, and wireless device 502 can send a message to access node 504 to determine whether a second radio access technology is available at access node 504. Communication system 500 can be a multi-technology communication system in which two or more radio access technologies are provided by the communication system. In an embodiment, the second radio access technology can comprise a lower latency or higher speed radio access technology than the first radio access technology. For example, the first radio access technology can comprise CDMA, W-CDMA, GSM, eHRPD (evolved high rate packet data), and the like, the second radio access technology can comprise LTE, LTE Advanced, WiMAX, or another so-called 4G radio access technology. The first message can be received at access node 504, and can be processed at processing node 510, or at access node 504, or at another network element of communication system 500. In some cases, the first radio access technology can be associated with a first communication network and the second radio access technology can be associated with a second communication network. In an embodiment, message is received from the wireless device when the wireless device establishes a data communication session with the access node using the first radio access technology to send the message.

Based on the message from the wireless device, an identifier of the wireless device and an identifier of the first access node are determined (operation 608). The identifier of the wireless device can comprise a unique identifier of the wireless device which indicates the capabilities of the wireless device to use one or more radio access technologies. Additionally, or alternatively, the wireless device identifier can be used by processing node 510 (or another network element of communication system 500) to determine whether wireless device 502 is authorized to use the second radio access technology. When wireless device 502 is not authorized to use the second radio access technology, a message indicating the lack of authorization can be sent to the wireless device. The identifier of the first access node can comprise a unique identifier of the access node which indicates the capabilities of the access node, including the radio access technologies available at the access node.

Based on the access node identifier and the access node sector identifier it is identified whether the second radio access technology is available at a second access node (operation 610). The identification that the second radio access technology is available at, for example, access node 506, can be made at processing node 510, at access node 504, or at another network element of communication system 500. When the second radio access is available at access node 506, a message is sent to wireless device 502 indicating that the second radio access technology is available at second access node 506 (operation 612). The indication can also comprise an instruction for wireless device 502 to scan for the second radio access technology.

When the second radio access technology is detected at wireless device 502, a handover is performed to change wireless device 502 from communicating with access node 504 using the first radio access technology to communicating with access node 506 using the second radio access technology (operation 614).

Figure 7:
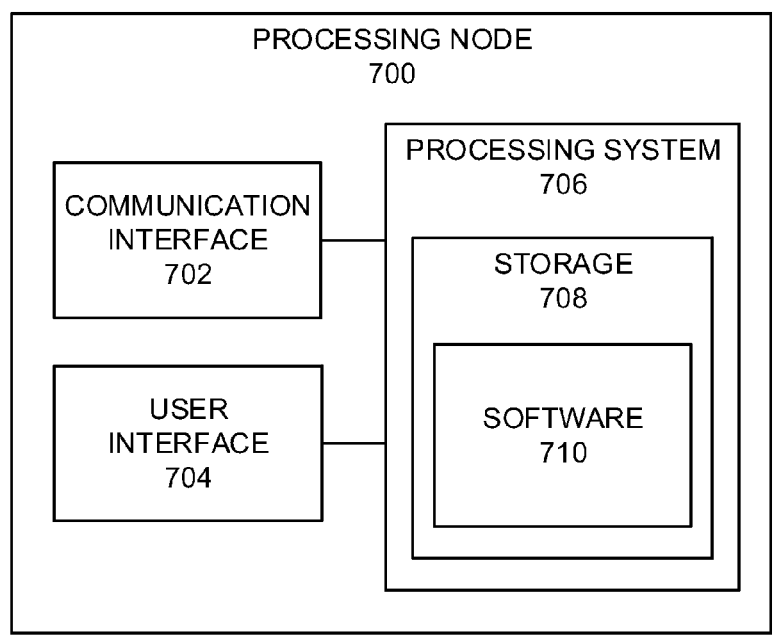
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine the availability of a radio access technology. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access node 104, processing node 108, access nodes 504 and 506, and processing node 510. Processing node 700 can be an adjunct or component of a network element. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of determining the availability of a radio access technology, comprising:
   receiving a first message from a wireless device in communication with an access node using a first radio access technology to request an availability of a second radio access technology at the access node;
   determining based on the first message an identifier of the wireless device and an identifier of the first access node;
   identifying based on the access node identifier that the second radio access technology is available at the access node; and
   sending to the wireless device a second message instructing the wireless device to scan for the second radio access technology.

2. The method of claim 1, wherein the first radio access technology is associated with a first communication network and the second radio access technology is associated with a second communication network.

3. The method of claim 1, further comprising preventing the wireless device from scanning for the second access technology until the second message is sent instructing the wireless device to scan for the second radio access technology.

4. The method of claim 1, wherein the second message instructs the wireless device to scan for the second radio access technology while maintaining communication with the access node using the first radio access technology.

5. The method of claim 1, wherein the first message is received from the wireless device when the wireless device establishes a data communication session with the access node using the first radio access technology to send the message.

6. The method of claim 1, further comprising determining based on the first message a sector of the access node with which the wireless device is in communication with the access node.

7. The method of claim 6 further comprising identifying based on the sector of the access node that the second radio access technology is available at the access node.

8. A method of determining the availability of a radio access technology, comprising:
   receiving a first message from a wireless device in communication with an access node using a first radio access technology to request information about an availability of a second radio access technology at the access node;
   determining based on the message an identifier of the wireless device and an identifier of the access node;
   identifying based on the access node identifier whether the second radio access technology is available at the access node;
   sending to the wireless device a second message instructing the wireless device to scan for the second radio access technology when it is identified that the second radio access technology is available at the access node; and
   indicating to the wireless device a message that the second radio access technology is not available at the access node when it is identified that the second radio access technology is not available at the access node.

9. The method of claim 8, wherein indicating to the wireless device that the second radio access technology is not available at the access node further comprises instructing the wireless device to send a second message to request the availability of the second radio access technology at an indicated future time.

10. The method of claim 9, wherein the future time is one of when the wireless device enters a new sector of the access node, when the wireless device enters a sector of the second access node, and after a predetermined duration.

11. The method of claim 8, wherein indicating to the wireless device that the second radio access technology is not available at the access node further comprises sending the second message at a first predetermined time after the first message is received to indicate that the second radio access technology is not present at the access node.

12. The method of claim 11, wherein the first delay time and the second delay time are determined based on the first radio access technology.

13. The method of claim 8, wherein indicating to the wireless device that the second radio access technology is not available at the access node further comprises sending the second message at a second predetermined time after the first message is received to indicate that a channel using the second radio access technology at the access node cannot accept the wireless device.

14. The method of claim 8, wherein indicating to the wireless device that the second radio access technology is not available at the access node further comprises sending the second message at a third predetermined time after the first message is received to indicate that the second radio access technology is not available at the access node nor at a neighbor access node.

15. The method of claim 8, wherein indicating to the wireless device that the second radio access technology is not available at the access node further comprises sending the second message at a fourth predetermined time after the first message is received to indicate that the second radio access technology is not available at the access node nor at second access nodes within a predetermined radius of the access node.

16. The method of claim 8, further comprising:
   determining based on the wireless device identifier and the access node identifier that the access node is associated with a different communication network than the wireless device; and
   indicating to the wireless device that the second radio access technology is not available at the access node.

* * * * *